US012558714B2

(12) United States Patent
Filali Ansary et al.

(10) Patent No.: US 12,558,714 B2
(45) Date of Patent: Feb. 24, 2026

(54) MAINTENANCE DEVICE FOR PERFORMING MAINTENANCE OF A SHELF RAIL

(71) Applicant: VUSIONGROUP SA, Nanterre (FR)

(72) Inventors: Tarik Filali Ansary, Nanterre (FR); Andreas Rössl, Nanterre (FR)

(73) Assignee: VUSIONGROUP SA, Nanterre (FR)

( * ) Notice: Subject to any disclaimer, the term of this patent is extended or adjusted under 35 U.S.C. 154(b) by 118 days.

(21) Appl. No.: 18/708,705

(22) PCT Filed: Dec. 29, 2021

(86) PCT No.: PCT/EP2021/087818
§ 371 (c)(1),
(2) Date: May 9, 2024

(87) PCT Pub. No.: WO2023/126056
PCT Pub. Date: Jul. 6, 2023

(65) Prior Publication Data
US 2025/0001466 A1 Jan. 2, 2025

(51) Int. Cl.
*B08B 6/00* (2006.01)
*B08B 5/00* (2006.01)
*G09F 3/20* (2006.01)

(52) U.S. Cl.
CPC .................. *B08B 6/00* (2013.01); *B08B 5/00* (2013.01); *G09F 3/204* (2013.01); *G09F 3/208* (2013.01)

(58) Field of Classification Search
CPC ... B08B 6/00; B08B 5/00; G09F 3/204; G09F 3/208
See application file for complete search history.

(56) References Cited

U.S. PATENT DOCUMENTS 5,553,412 A * 9/1996 Briechle ................. G09F 3/204 40/463
7,461,782 B2 * 12/2008 Andersson .............. G06F 3/147 235/383
(Continued)

FOREIGN PATENT DOCUMENTS

GB 2278947 A 12/1994
JP H03-039133 A 2/1991
(Continued)

OTHER PUBLICATIONS

An Office Action; "Notice of Reasons for Refusal," mailed by the Japanese Patent Office on Sep. 9, 2025, which corresponds to Japanese Patent Application No. 2021-009779 and is related to U.S. Appl. No. 18/708,705; with English language translation.
(Continued)

*Primary Examiner* — Eret C McNichols
(74) *Attorney, Agent, or Firm* — Studebaker Brackett PLLC

(57) ABSTRACT

Shelf rail maintenance device (14) for the maintenance of at least one electrical conductor (6) of a shelf rail (3), wherein the electrical conductor (6) is located in a receiving groove (4) of an electronic shelf rail (3) and extends freely accessible along the length extension of the receiving groove (4), wherein the maintenance device (14) comprises at least one interaction element (15; 15A, 15B, 15C) which is designed for maintenance interaction with the at least one electrical conductor (6) of the electronic shelf rail (3), characterized in that at least a part of the maintenance device (14) is designed to fit into the receiving groove (4), such that the at least one interaction element (15; 15A, 15B, 15C) is posi- (Continued)

tion-able in the receiving groove (14) corresponding to the location of the at least one electrical conductor (6).

16 Claims, 12 Drawing Sheets

(56) References Cited

U.S. PATENT DOCUMENTS

| | | | | |
|---|---|---|---|---|
| 7,900,387 | B2 * | 3/2011 | Lee | G09F 3/208<br>235/383 |
| 8,141,283 | B2 * | 3/2012 | Lee | G09F 3/208<br>40/655 |
| 11,232,720 | B2 * | 1/2022 | Le | G09F 3/208 |
| 2010/0088937 | A1 | 4/2010 | Lee et al. | |
| 2018/0268745 | A1 | 9/2018 | de Haas | |

FOREIGN PATENT DOCUMENTS

| | | | |
|---|---|---|---|
| JP | 2008-529698 | A | 8/2008 |
| JP | 2011-082138 | A | 4/2011 |
| JP | 2011-160835 | A | 8/2011 |
| JP | 2014-079404 | A | 5/2014 |
| JP | 2016-037808 | A | 3/2016 |
| JP | 2019-517283 | A | 6/2019 |
| WO | 2006/087424 | A1 | 8/2006 |
| WO | 2017/153481 | A1 | 9/2017 |

OTHER PUBLICATIONS

International Search Report issued in PCT/EP2021/087818; mailed Aug. 19, 2022.

* cited by examiner

MAINTENANCE DEVICE FOR PERFORMING MAINTENANCE OF A SHELF RAIL

TECHNICAL FIELD

The invention relates to a maintenance device for performing a maintenance of a shelf rail.

BACKGROUND

Electric shelf rails are used to carry electronic shelf labels (ESLs for short) and to supply them with power for the electrical operation and/or data to display information. For this purpose, such shelf rails comprise electrical conductors with which the ESLs can be coupled. Such shelf rails are typically used in commercial premises such as supermarkets.

For a long time, the soiling of the shelf rails and soiling of the electrical conductors was a major problem. In the past, electrical shelf rails have been developed in which the electrical conductors could be largely protected from contamination by a special placement of the electrical conductors and a partial covering of the electrical conductors. Such a shelf rail is described in the published international patent application WO2017/153481A1.

However, because there is typically always some dust in the air in the areas in which such shelf rails are used, over time the dust builds up on the electrical conductors, even with such sophisticated shelf rails. Furthermore, the humidity or other substances in the air, which cannot be efficiently avoided, can lead to oxidation on the electrical conductors. Even if these modern shelf rails need to be maintained much less frequently than comparable shelf rails, there has been no efficient way to carry out this maintenance up to now.

Therefore, the object of the invention is to provide an electronic shelf rail maintenance device with which electronic shelf rails can be maintained quickly and easily.

SUMMARY OF THE INVENTION

This object is achieved by a shelf rail maintenance device according to claim 1. Therefore, the subject matter of the invention is a shelf rail maintenance device for the maintenance of at least one electrical conductor of an electronic shelf rail, wherein the at least one electrical conductor is located in a receiving groove of the electronic shelf rail and extends freely accessible along the length extension of the receiving groove, wherein the maintenance device comprises at least one interaction element which is designed for maintenance interaction with the at least one electrical conductor of the electronic shelf rail, characterized in that at least a part of the maintenance device is designed to fit into the receiving groove, such that the at least one interaction element is position-able in the receiving groove corresponding to the location of the at least one electrical conductor.

Furthermore, this object is achieved by an electronic shelf rail system according to claim 15. Therefore, the subject matter of the invention is also an electronic shelf rail system that comprises a electronic shelf rail that is designed to carry at least one electronic device, in particular at least one electronic shelf rail, wherein the electronic shelf rail comprises at least one electrical conductor, preferred at least two electrical conductors, particularly preferred three electrical conductors, wherein the at least one electrical conductor is located in a receiving groove of the electronic shelf rail and extends freely accessible along the length extension of the receiving groove, and at least one shelf rail maintenance device according to one of the preceding claims 1-14 that is placed into the receiving groove movable along the receiving groove to maintain the at least one electrical conductor.

The measures according to the invention provide the advantage that for the first-time modern shelf rails with electrical conductors, which are located in the receiving groove where they are basically covered by the structural shape of the electronic shelf rail and therefore protected from direct access, can be maintained efficiently.

Such a shelf rail comprises for example a reference-wall and a conductor-carrier that is located in a distance from the reference-wall, such that the receiving groove is formed between the reference-wall and the conductor-carrier, of which both are preferably wall shaped.

The at least one electrical conductor to be maintained is located within this receiving groove. The at least one electrical conductor is implemented as a conductor track or wire that is hidden from the outside in the receiving grove and that extends along the rail in the reviving groove. In the preferred embodiment there are three electrical conductors, one for the ground potential, one for the supply voltage, and one for data and/or signal communication. However, there can also be more or less than three electrical conductors.

The definition that the maintenance device is designed to fit in the receiving groove of the shelf rail shall mean that the form and structure of at least a respective part of the maintenance device is designed to allow the maintenance device to enter into the receiving groove along an insertion path and, once entered into the receiving groove, to provide sufficient stability so that the interaction element can interact with the at least one electrical conductor to perform the maintenance interaction.

The position and orientation of the interaction element on the maintenance device is set such that the interaction element is located corresponding to the location of the electrical conductor once the maintenance device is properly placed in the receiving groove. This measure allows the interaction element to come in contact with the at least one electrical conductor or to be placed in close proximity to the at least one electrical conductor once the maintenance device is placed in the receiving groove.

Accordingly, during the utilization of the maintenance device it is not required that the user has visual contact with the at least one electrical conductor because the form of the maintenance device and the positioning and/or orientation of the at least one interaction element allows an automatic perfect positioning and/or alignment of the maintenance device in the receiving groove.

It should be noted that the electrical conductor, which is used for the electronic operation of the electronic device, is accessible only from inside the receiving groove. At the same time, the electrical conductors are covered by the electronic shelf rail in such a way that a person who touches the electronic shelf rail cannot accidentally touch the electrical conductors.

Further to this it is to mention that each of the at least one interaction elements can interact with one or more electrical conductors. One separate interaction element can thus be assigned to each electrical conductor. However, several interaction elements can also be assigned to only one electrical conductor, or several electrical conductors can be assigned to only one interaction element.

Further particularly advantageous embodiments and extensions of the invention arise from the dependent claims and the following description.

Basically, the receiving groove is intended for receiving a conducting section of the electronic device, in particular of the ESL, in order to establish an electronic connection between the electronic device and the electronic shelf rail.

Preferably the receiving groove is designed to be accessible from only one direction. This means that the receiving groove is delimited by three walls leaving an access open between two sidewalls (e.g. the first wall is realized by the reference wall and the second wall is realized by the conductor carrier), which are connected by a further wall opposite to the access. In a preferred embodiment the conductor carrier carries the at least one electrical conductor on that side which faces inside the receiving groove. Seen from the front of the shelf rail this is the side of the conductor carrier that is invisible, or in other words that is hidden in the receiving groove.

The basic intention behind the design of the receiving groove is to receive—at least partly—an electronic derive such as an electronic shelf label device. In a preferred embodiment, the receiving groove has a U-shape standing on the head, so that the receiving groove is open from below in order to be able to receive an electronic device from below. Hence, also the maintenance device may enter the receiving groove accordingly. In addition, the groove extends uninterruptedly along the longitudinal extent of the rail.

On one end of the at least one electrical conductor, the at least one electrical conductor is connected to a supply unit, that supply the electronic shelf rail and in particular the electronic devices that are installed on the electronic shelf rail with power and/or signals and/or data. The supply unit is also termed rail controller. It may be embedded into the shelf rail, or it may also be detachable from the shelf rail. However, the rail controller may also be located remote from the self rail and the at least one electrical conductor may be connected with appropriate connection means (e.g., connectors and wires) to the rail controller. In particular, the rail controller is connected to at least three electrical conductors so to supply a supply voltage and to enable data and/or signal communication.

Preferably, the at least one electrical conductor is located on or in a conductor-carrier that is designed (e.g. as a wall) to be encompassed by the at least one electronic device, preferably in a way that the at least one electrical conductor faces away from a front of the electronic device as explained above. In a preferred embodiment the at least one electrical conductor is located on the rear side of the conductor-carrier which faces in the direction of the reference-wall.

For this purpose, the electronic device comprises a conductor-carrier-groove into which the conductor-carrier can be inserted, so that the electronic contact(s) of the electronic device can come into contact with the electrical conductor(s) of the shelf rail. It is highlighted that the conductor-carrier can glide into the conductor-carrier grove of the electronic device when the electronic device is moved into the shelf rail. In a preferred embodiment the conductor-carrier-groove is realized between a back-wall and a front wall of the electronic device. If the electronic device is realized as an electronic shelf label, there will be a screen on the front wall.

In this configuration the back wall of the electronic device is located in the receiving groove of the electronic shelf rail and the front wall of the electronic device covers the conductor-carrier. This design of the shelf rail and the associated electronic devices makes it possible to hide the at least one conductor in the receiving groove, to keep dirt away from the electrical conductors and to minimize the risk of damage of the electric conductors. As a consequence, the maintenance of the at least one electrical conductor can be carried out efficiently by means of the maintenance device that is adapted to this special electronic shelf rail, in particular to fit into the receiving grove in order to access the at least one conductor with the maintenance interaction there.

Maintenance can take place in different ways, so that several variants of the interaction element have proven to be advantageous, which are applicable alone or in combination.

The maintenance can include, for example, but not exclusively, cleaning, corrosion control, corrosion treatment, corrosion prevention, error detection and error handling. The errors may be, in particular, errors in the shape and position of the electrical conductors and so one.

The focus here is on maintaining the electrical conductor (s). However, the measures mentioned here can also be adapted in order to maintain additional areas of the electronic shelf rail, in particulate if located inside the receiving groove.

According to an aspect of the invention the at least one interaction element is designed for mechanical maintenance interaction.

A mechanical maintenance-interaction can comprise scrubbing, wiping, brushing, abrading, scraping and the like. Therefor an interaction element that is designed for mechanical maintenance-interaction can comprise or be realized as in particular, but not exclusively, a scrubber, a wiping element, a brush, a scraper, and/or a knife.

According to a further aspect of the invention the at least one interaction element is designed for maintenance-substance maintenance interaction.

A maintenance-substance maintenance interaction comprises applying a substance to the electrical conductor(s) for a maintenance purpose.

One or more substances can be used here.

The substance can be solid, liquid or gaseous. A liquid substance can be low or high viscous.

The substance is preferably liquid, at least temporarily, in particular at least when it is applied. The substance is particularly preferably liquid at room temperature and the usual ambient pressure.

A substance that is used can comprise or be realized as, in particular, but not exclusively, water, a detergent, a soap, a corrosion remover, a corrosion converter, in particular a rust converter, an oil, a fat, or an indicator ink.

An indicator ink can be used to mark the electrical conductor. If a shape or position error accrues to the electrical conductor, the marked erroneous electrical conductor will interact with the maintenance device passing the electrical conductor in the receiving groove while the maintenance process, so that the indicator ink marks the maintenance device at the corresponding place. In this way, the damaged or misplaced electrical conductor can quickly be identified.

A substance can be applied as in particular, but not exclusively, by the aid of nozzles, brushes, sponges or a similar object for capillary substance uptake.

The maintenance device preferably comprises a substance storage or is connected to a substance storage. The substance storage can for example be designed to store the substance by means of a capillary-effect. Preferably the substance storage is designed to store the substance in a substance-storage tank.

Pumps, motors, etc. can be provided in order to convey the substance out of the substance store and subsequently to apply it to the electrical conductors.

Preferably the cleaning device is designed to release the substance only locally in at least two separated places regarding to at least two different electrical conductors. This is particularly advantageous when the substance is electrically conductive. Due to the release at clearly defined dedicated positions, a short circuit between electrical conductors can be avoided even when such an electrically conductive substance is used.

For this purpose, for example, two or more nozzles are provided which release the substance at different locations. Seals such as sealing lips can also be provided, which separate these locations or areas from one another, so that no conductive liquid film can arise between the two neighboring electrical conductors.

To avoid a short circuit, the amount of substance used must of course be adapted to the measures taken. According to another aspect of the invention the at least one interaction element is designed for electrostatic maintenance interaction.

For this purpose, the maintenance device, in particular the interaction element, can be designed to collect pollution, for example, dust or fine drops like aerosols of liquid by means of static electricity. The interaction element can therefore be designed as an electrostatic cleaning element. Such an electrostatic cleaning element is designed to be electrostatically charged so that the electrostatic cleaning element can attract the particles that pollute the electrical conductors. The electrostatic maintenance-interaction can for example be based on the triboelectric effect or electrostatic induction.

According to another aspect of the invention the at least one interaction element is designed for airflow maintenance interaction.

For this purpose, the maintenance device can be designed to blow air towards the electrical conductor and/or to suck air away from the electrical conductor, similar like a vacuum cleaner.

The maintenance device and in particular the interaction element is designed to guide the air flow to the electrical conductors or away from the electrical conductors, which may be realized by individual nozzles or a slit nozzle or the like.

In order to establish the airflow, the maintenance device can comprise an internal or external airflow generation device, like a turbine or a fan, a compressor or the like.

According to another aspect of the invention the at least one interaction element is designed for position and/or alignment check maintenance interaction.

Such a position and/or alignment check maintenance interaction can take place in different ways, as is shown in the following examples in a non-exclusive manner.

For example, the interaction element can be realized as a displacement sensor that is moved along the electrical conductor (wire) and checks the position of the wire to determine whether it is in its desired position. With this sensor it is possible to detect sections of the electrical conductor that have moved out of the target position.

The maintenance device can also comprise a laser-based system with which the position/alignment of the electrical conductor is checked. Here, the interaction element is designed as a laser delivery unit and/or as a light detection unit.

The maintenance device can also comprise a camera-based system that is designed for visual inspection of the electrical conductor. Here, the interaction element is designed as a camera.

Combinations of these can also occur. Thus, both an interaction element can be provided that emits a laser and an interaction element that is designed as a camera that captures the image of the electrical conductor influenced by the laser.

The captured still image or video can be sent to an external display. However, the maintenance device itself may comprise a screen which displays the still image or video immediately, which allows to precisely identify the positions concerned where the misplacement or misalignment is located.

It is of particular benefit that the maintenance device is designed to be movable along the shelf rail in the receiving groove. According to this particular embodiment, the maintenance device can maintain the at least one electrical conductor along its entire length while the maintenance device moves along the shelf rail, once the maintenance device is inserted and positioned in the receiving groove. This measure allows the at least one electrical conductor to be uninterruptedly maintained along its longitudinal extension. Hence the entire maintenance process for the entire shelf rail can be performed relatively quickly without the need to repeatedly exit and re-enter the maintenance device into the shelf rail at discrete positions. It should be emphasized that the design of the maintenance device, which enables free movement along the shelf rail, contrasts with the design of the electronic devices that are intended for use on such a shelf rail and that are designed to snap into the shelf rail without being movable along the shelf rail.

According to a further aspect, it has been found beneficial that the maintenance device comprises an approach mechanism that is designed to bring the interaction element in close proximity to or in contact with the electrical conductor.

The approach mechanism is thus designed to move the interaction element in the direction of the electrical conductor and/or to apply a force in order to establish reliable contact between the interaction element and the electrical conductor.

For this purpose, the approach mechanism can be designed to move the entire maintenance device within the cross-section of the receiving groove. For example, the approach mechanism can push against the reference wall (or the conductor-carrier) of the electrical shelf rail in order to move or push the entire maintenance device with the interaction element towards the electrical conductor.

However, the approach mechanism can also be designed to move only a part of the maintenance device, in particular essentially only the interaction element. Thus, the approach mechanism can be designed to press the interaction element against the electrical conductor or towards the electrical conductor while the maintenance device rests on the reference wall of the electronic shelf rail.

The approach mechanism can comprise a spring-loaded mechanism such as a leg spring, a helical spring or a gas spring. Further elements, such as levers, etc., can also be provided which redirect the force or movement to an intended point. For example, a spring-loaded mechanism can be used to push the entire maintenance device away from the reference wall, or to push the interaction elements towards the electrical conductor.

However, the approach mechanism can also comprise other mechanisms, instead of or in addition to the spring mechanism, in order to produce a force and/or a displacement. For example, the approach mechanism can comprise electromagnets or electric motors. Such an electric motor or electromagnet can drive a camshaft or a threaded rod or the like, so that a corresponding movement or force is produced.

This measure makes it possible to place the interaction element at a defined distance from the electrical conductor or to press the interaction element with a defined pressure against the electrical conductor without the need for manual readjustments.

Furthermore, it has proven to be advantageous that the maintenance device comprises a insertion path limiting element that is designed and/or positioned to limit an insertion path of the maintenance device in such a way that the interaction element is located corresponding to the location of the electrical conductor, when the maintenance device is being entered into the receiving groove of an electronic shelf rail along an insertion path as soon as the limit of the insertion path is reached.

This measure ensures that once the device is inserted, the interaction element is properly positioned to allow maintenance interaction with the electrical conductor. It is thus avoided that the interaction element moves past the electrical conductor and is positioned too deep in the shelf rail or that the interaction element is not inserted far enough into the shelf rail to enable a maintenance interaction.

For this purpose, the insertion path limiting element can be designed, for example, as a mechanical end stop.

The insertion path limiting element can therefore be an element that is placed and formed in such a way, that it contacts with the electronic shelf rail once the maintenance device is inserted deep enough into the electronic shelf rail to perform the maintenance interaction, so that the maintenance device is not movable any deeper into the electronic shelf rail. The design of the insertion path limiting element also ensures that the maintenance device remains freely moveable along the electronic shelf rail.

Further to this, the shelf rail maintenance device may comprise a guiding mechanism, that is designed to guide the interaction element when the maintenance device is moved along the shelf rail.

The word "guiding" means that the guiding mechanism ensures that the interaction element is guided along the electrical conductor, which extends along its target course, or the expected target course of the electrical conductor.

The guiding mechanism makes it possible to keep the interaction element permanently perfectly positioned when the maintenance device is moved along the electronic shelf rail and to prevent disruptive events such as slipping or wedging of the device.

For this purpose, the mechanism can, for example, comprise a beam, a post or the like that rests on the electronic shelf rail and guides the maintenance device there.

The guiding mechanism can therefore be an essentially static element that is statically connected to the rest of the maintenance device with the exception of possible spring deflections of the static element.

As discussed below, however, the guiding mechanism can also comprise moving elements such as wheels, gears, chains, belts, etc.

In general, it has proven to be advantageous that the shelf maintenance device comprises at least one moveable element which is movable relative to the maintenance device.

This means that the movable element is movable within the maintenance device. The movable element is thus designed to carry out a relative movement with respect to the maintenance device. A movement is to be understood here as a movement that goes beyond deformation as a result of frictional forces, as occurs on bristles while brushing.

The movable element is preferably designed to be in contact with the shelf rail, for example to roll off it.

The movable element preferably performs a rotating movement within the maintenance device.

The at least one movable element can be used for different tasks, as described below.

As mentioned, at least one movable element can be used to implement the guide mechanism. For this purpose, for example, wheels can be provided on which the device can be moved guided. Such a movable element can also be used to prevent certain movements of the maintenance device. The use of at least one movable element for the realization of the guiding mechanism enables low-friction guidance.

Furthermore, the at least one interaction element can comprise at least one movable element or be implemented as a movable element. For example, the interaction element can be realized as a rotatable, fabric-covered wheel that is designed to wipe the electrical conductor.

In order to realize an electrostatic maintenance interaction, the movable interaction element can be designed to generate an electrical charge by means of the triboelectric effect. For this purpose, a corresponding friction partner can also be provided on which the movable element rubs. Also, the friction partner can be designed to perform the electrostatic maintenance interaction.

It is therefore advantageous that the interaction element is designed moveable within the maintenance device.

A movable element can also be designed to drive another movable element. For example, a wheel can be provided that, when the maintenance device is moved along the electronic shelf rail, rolls on the electronic shelf rail and is thereby set in rotation. This wheel can drive a fabric-covered wheel that forms the interaction element. This allows the fabric-covered wheel to be driven to perform the maintenance interaction.

Such a moving element can also be used to implement a drive, as discussed below.

Therefore, the shelf maintenance device according to a further aspect of the invention comprises a driving mechanism that is designed to drive the maintenance device along the shelf rail.

Such a driving mechanism can for example be implemented by the aid of a friction motor or a clockwork motor like a pullback motor.

For example, with such a drive mechanism implemented with the aid of a pullback motor, an employee can insert the maintenance device into the electronic shelf rail close to the right end of the shelf rail and move it a little to the right, whereupon the device automatically moves to the left end of the shelf rail. At the same time, the employee can insert the next device in the electronic shelf rail above or below and repeat the process. The maintenance devices can then be collected at the left end of the shelf rail. Of course, the sides can also be swapped for this process.

If electronic devices, such as ESLs, are still used in the electronic shelf rail, the maintenance device can still be started. The maintenance device then moves until it is in contact with the electronic device. The electronic device can then be removed by the employee and inserted again after the maintenance device has passed its position. The maintenance device continues to move automatically as soon as the path is clear. This ensures that the maintenance interaction takes also place at the locations of the electronic device and all electronic devices are returned to their previous position after the maintenance process.

Preferably the driving mechanism is implemented by the aid of an electric motor.

A maintenance device that functions with such a driving mechanism with the aid of an electric motor can be used in the same way as the previously discussed maintenance device with the pullback motor. In this case, however, additional sensors can be provided so that the maintenance device stops, for example, before it presses against the electronic device in the electronic shelf rail. This makes it easier for the employee to remove the electronic device from the shelf rail and insert it again after passing the maintenance device.

The maintenance device therefore preferably comprises at least one path sensor that detects whether the path along the electrical conductor is blocked.

Electric motors can be used not only for the drive mechanism, but also for driving a movable element of the interaction element or a movable interaction element.

In order to power electrical functions of the maintenance device it is beneficial that the maintenance device is designed to contact the at least one electrical conductor of the shelf rail electronically and to draw power from the at least one electrical conductor.

Therefore, the maintenance device preferably comprises at least one sliding contact, preferably two such sliding contacts. Typically, the electronic shelf rail comprises two electrical conductors, that are used to provide electrical power and each of which is individually contacted with one of the sliding contacts.

The electronic shelf rail usually comprises a third electrical conductor which is designed to convey information by means of data or signals. The maintenance device may also be equipped with a third sliding contact to contact this third electrical conductor of the shelf rail in order to provide a communication link.

The maintenance device may also comprise electronics, in particular a processing stage (e.g., a microcontroller or the like) in order to process data and/or to communicate data.

The maintenance device can thus determine the status of the electrical shelf rail, optionally store it by means of data, and transmit it in the form of communications data via the third electrical conductor of the shelf rail to a shelf rail control unit and in turn to a server or the like. The status can include, for example, when the shelf rail or its contacts were last cleaned, when corrosion protection was last applied and/or whether there are any detected alignment or position errors regarding the electrical conductor(s) and so on.

If, for example, the alignment or position errors of the electrical conductors are detected, this can be documented centrally in the server so that all those shelf rails within a business premise where an error was detected can then be easily found and repaired or replaced at once.

Furthermore, it has proven to be advantageous that the maintenance device comprises an energy storage to store energy, preferably electric energy.

As indicated in the context of the driving mechanism, this energy store can, for example, store energy in a spring or in a flywheel.

However, as soon es electronics exists within the maintenance device the energy storage is preferably realized by a battery or an accumulator, which stores electrical energy. As a result, the maintenance device can also be used if no electrical power is provided by the electrical conductors or if the contact to the electrical conductors which are intended to supply is (temporarily) interrupted.

It is also possible to drive the maintenance device electronically if the power supply to the electronic shelf rail is switched off on purpose. This may be necessary, for example, when a maintenance process with a lot of (soapy) water is planned for which the power supply to the electrical conductors is interrupted in order to avoid a short circuit.

In summary, it can be stated that the maintenance device can be designed to move automatically along the at least one electrical conductor.

However, the maintenance device can also be designed to be moved manually along the electrical conductor.

The maintenance device can comprise a handle so that the maintenance device can be grasped by the handle.

The handle is preferably designed in such a way that the at least one interaction element can be pulled towards the electrical conductor by pulling on the handle.

Preferably the maintenance device is designed to mechanically support the electronic shelf rail, in particular the conductor-carrier, when inserted into the electronic shelf rail. This mechanical support ensures that forces and moments caused by the maintenance device that act on the electronic shelf rail are largely balanced, and that the resulting forces are minimized. For this purpose, the maintenance device preferably comprises a support structure. Such a support structure can be designed, for example, to balance or absorb forces from the approach mechanism.

According to a preferred embodiment the housing of the maintenance device has a shape of the electronic shelf labels which are typically used with the electronic shelf rail, with the exception of the latching mechanism which avoids a longitudinal movement of the electronic shelf label along the electronic shelf rail. This simplifies the handling of the maintenance device.

Further to this the maintenance device may be embedded into an electronic shelf label.

Finally, it is to mention that electronic devices mentioned in the description of this patent application may be realized by the aid of well-known discreet and/or integrated electronics. Provided that interfaces are required the person skilled in the art will be able to select and design the appropriate interface-circuitry (transceivers) to enable data and/or signal communication. Programmable devices may comprise a microprocessor and some peripheral electronics. Such programmable devices may also be realized by the aid of a microcontroller or an application specific intergraded circuit (ASIC) and the like. Execution of software routines on such devices provides computer implemented functions that are discussed herein.

These and other aspects of the invention are obtained from the figures discussed below.

BRIEF DESCRIPTION OF THE FIGURES

The invention is explained again hereafter with reference to the attached figure and based on exemplary embodiments, which nevertheless do not limit the scope of the invention. The Figure shows in schematic fashion in:

FIG. 2A-3B a front side and a rear side of the device according to the FIGS. 1A-1B;

FIG. 3A-3B a further embodiment of the maintenance device;

DESCRIPTION OF THE EXEMPLARY EMBODIMENTS

Figure 9B:
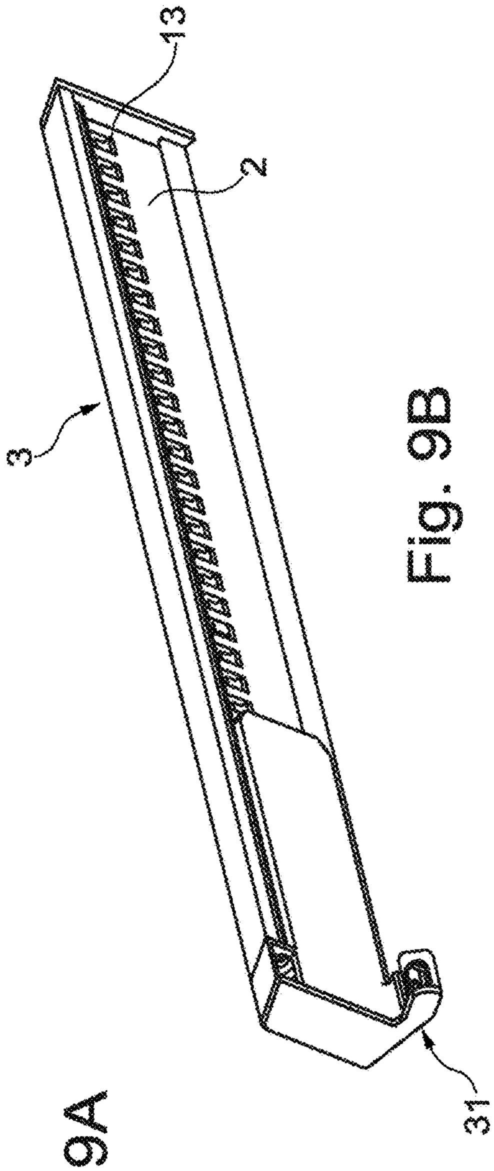
FIG. 9A-9B the electronic shelf rail with two electronic shelf labels and a rail controller.
Figure 9A:
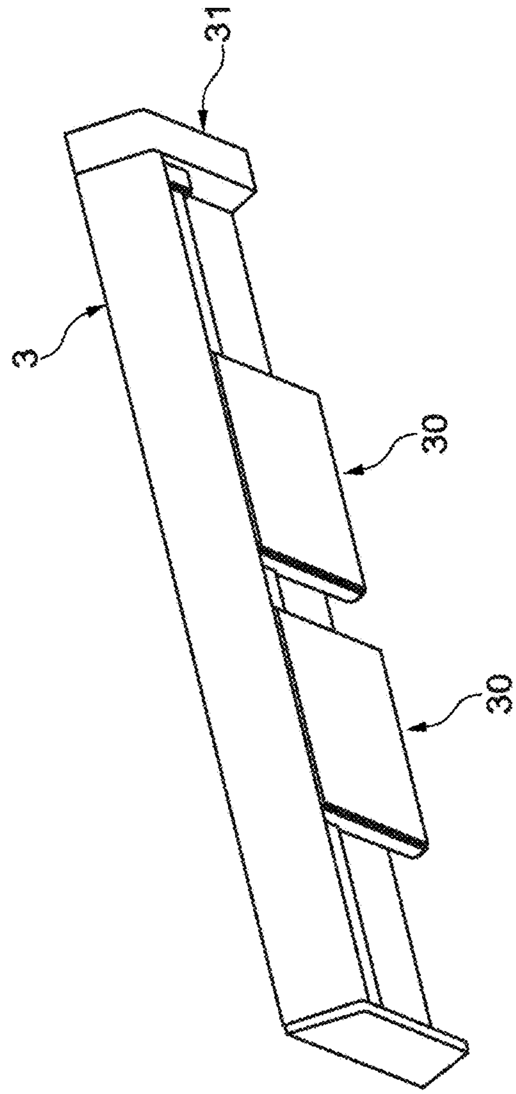

The FIG. 9A shows an electronic shelf rail 3 carrying two electronic shelf labels (ESL 30 for short). The electronic shelf rail 3 is connected to a rail controller 31 that supplies electrical power for the operation of the ESLs 30 and data to the ESLs 30. The front of the ESLs 30 is equipped with a display to display price and/or product information which is represented by the supplied data.

The FIG. 9B shows the rear side of the shelf rail 3 connected with the rail controller 31 shown in FIG. 9A. In this perspective a reference wall 2 of the electronic shelf rail 3 can be seen. The reference wall 2 comprises several recesses 13. The recesses 13 are arranged in a grid, which serve for fastening the ESL 30. The recess 13 enable a good connection between the ESLs 30 and the electronic shelf rail 3 and avoid the longitudinal movement long the shelf rail of the ESLs 30 as soon as the ESLs 30 are snapped into the recesses 13.

Figure 8B:
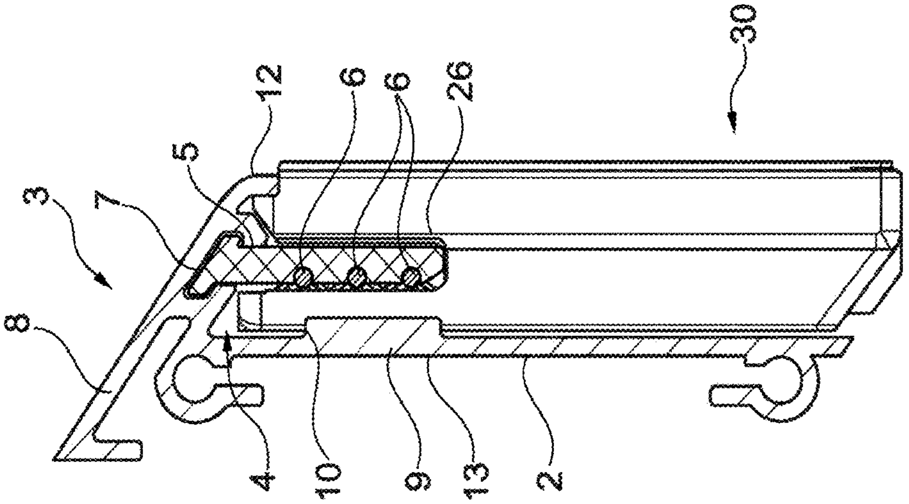
FIG. 8A-8B the electronic shelf rail and the electronic shelf label used with it.
Figure 8A:
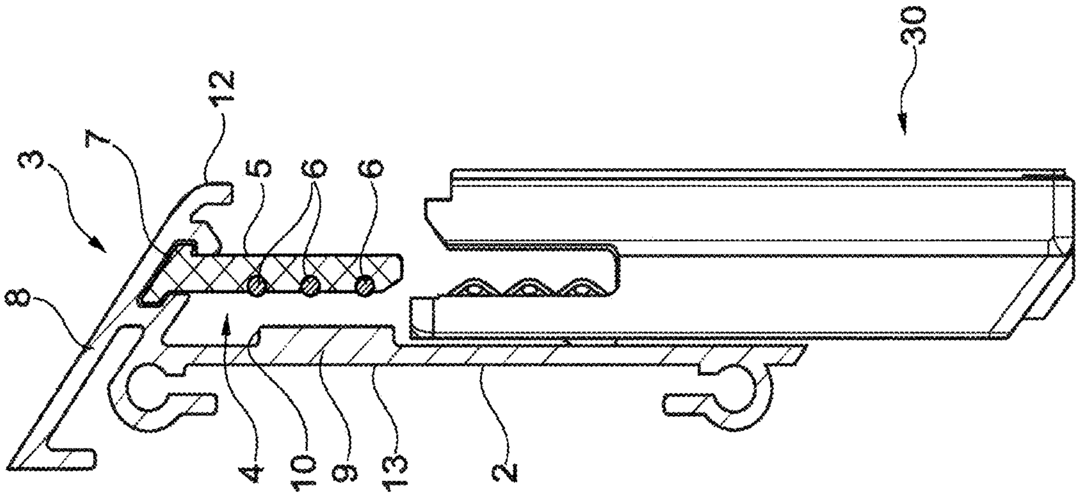

The FIGS. 8A and 8B show the mechanical and electrical interaction between the electronic shelf rail 3 and the ESL 30.

The shelf rail 3 comprises a first delimiting wall 2 (the reference wall 2), which is illustrated vertically in the FIGS. 8A and 8B.

On its upper end, the first delimiting wall or reference wall 2, respectively, merges into a second delimiting wall 8. In this exemplary embodiment, the second delimiting wall 8 and the reference wall 2 are made of steel in one piece.

Between the reference wall 2 and the second delimiting wall 8, there is located a receiving region 4, which is delimited on two sides by means of these walls 2 and 8, for receiving an electronic device, here the ESL 30.

The second delimiting wall 8 comprises a receiving shaft 7, into which a conductor support 5 (also termed conductor-carrier in the general description) is inserted, which is embodied as conductor support plate. On that side, which is inserted into the receiving shaft 7, the conductor support 5 is adapted to the shape of the receiving shaft 7, is thus formed essentially in a T-shaped manner. In the receiving shaft 7, the conductor support 5, normally on the image plane of FIGS. 8A (and 8B), can be shifted out of or into said image plane, respectively, in order to insert said conductor support there or also to remove it from there.

The conductor support 5 supports or carries three electrical conductors 6, realized as wires. The electrical conductors 6 are in each case made of a single-core copper wire 6 and are embodied in an insulation layer-free manner. More than 50% of the cross section of the wires 6, approximately two thirds of the radial dimension, are embedded in the conductor support 5. That wire 6, which is located closest to the second delimiting wall 8, is thereby the power supply line, the central conductor track 6, the signal supply line, and the conductor track 6, which is located farthest away from the second delimiting wall 8, is the reference potential line. The wires 6 are arranged on that side of the conductor support 5, which faces the reference wall 2.

The conductor support 5 and the reference wall 2 in each case have a first dimension (longitudinal extension), which represents the linear measure, measured out of the image plane or into the image plane, respectively, wherein both are of identical size in this exemplary embodiment and are, for example, approximately 1.5 m long. However, other length for the shelf rail 3 can also be provided.

The conductor support 5 has a second dimension (height), which represents the vertical expansion of the conductor support 5 in the FIGS. 8A and 8B. Corresponding thereto, the reference wall 2 has a third dimension (height), which specifies the vertical expansion of the reference wall 2 in FIGS. 8A and 8B. In this exemplary embodiment, the second dimension of the conductor support 5 is approximately 40% of the third dimension of the reference wall 2. In the case of this exemplary embodiment, the second dimension is, for example, approximately 3 cm.

The second delimiting wall 8 has on the end side, an edge region 12, which is formed in a lug-shaped or hook-shaped manner, respectively, and which, when the ESL 30 is inserted, prevents that the latter can be moved away from the reference wall 2 in the normal direction, based on the reference wall 2.

The electrical shelf rail 3 comprises guide ribs 9 around the recesses 13, which guide the ESL 30 when it is inserted. The guide ribs 9 form a framework or frame 10 within the receiving region 4. The ESLs 30 can hook into the recesses 13 and push themselves off the frame 10 in the direction of the second delimiting wall 8 by means of spring force.

Figure 1B:
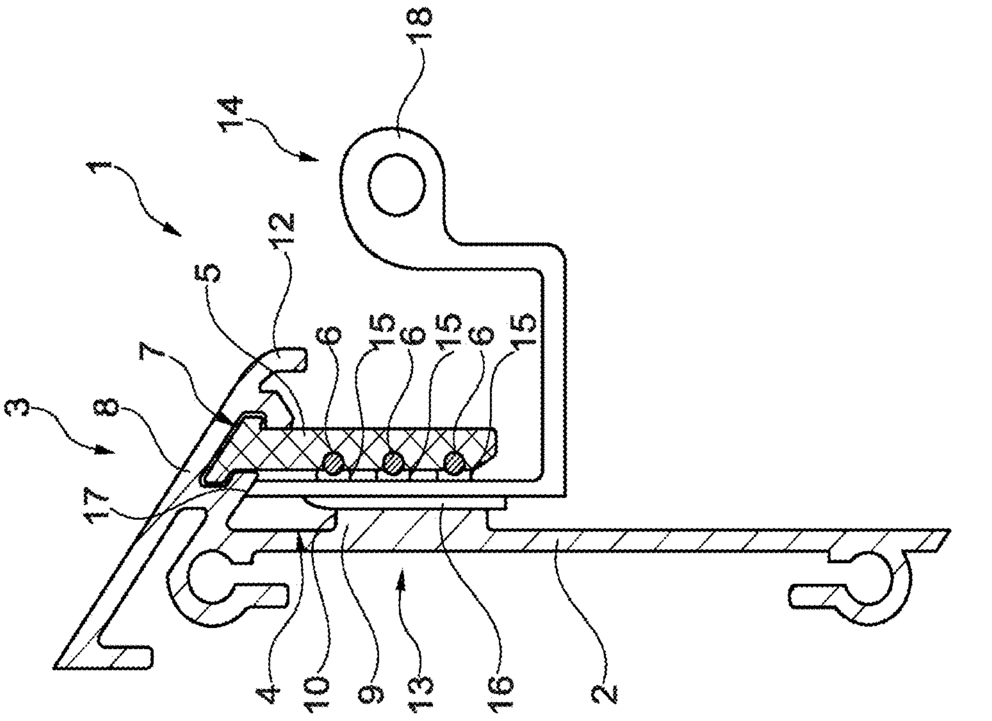
FIG. 1A-1B a shelf rail maintenance device according to a first embodiment and the shelf rail where it is used.
Figure 1A:
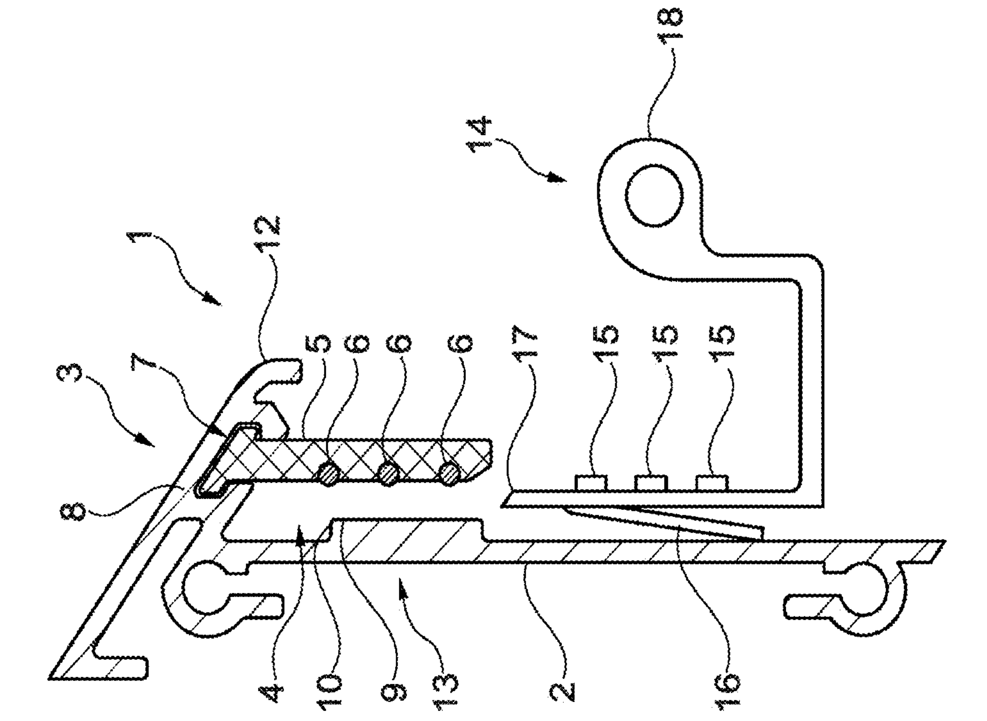

FIG. 1A visualizes an electronic shelf rail system 1 that comprises the electronic shelf rail 3 as explained above and a shelf maintenance device 14.

The maintenance device 14 comprises three interaction elements 15. The interaction elements 15 in this exemplary embodiment are realized by scouring pads that are intended for mechanical maintenance interaction. The interaction elements 15 in this embodiment can be used dry or moistened.

Furthermore, the maintenance device 14 comprises an approach mechanism 16. The approach mechanism 16 is realized by a leg spring that extends flatly along the maintenance device 14.

Furthermore, the maintenance device 14 comprises an insertion path limiting element 17 which, in this exemplary embodiment, is located above the approach mechanism 16 and the interaction elements 15. The insertion path limiting element 17 is designed as an end stop so that the interaction elements 15 are positioned corresponding to the electrical conductors 6 when the path limiting element 17 touches the second boundary wall 8 of the electronic shelf rail 3.

The maintenance device 14 further comprises a handle 18, that is designed such that the maintenance device 14 can be grasped by the handle 18 by a person to perform a maintenance process. Therefore, the handle 18 is designed in such a way that the interaction elements 15 can be pulled towards the electrical conductors 6 by pulling on the handle 18.

If the maintenance device 14 is now moved up into the electronic shelf rail 3, the maintenance device 14 is in the inserted state, that is, the state in which the maintenance device 14 is inserted into the electronic shelf rail 3, as shown in FIG. 1B.

In FIG. 1B, in the inserted state, the insertion path limiting element 17 is in contact with the second boundary wall 8 of the electronic shelf rail 3, so that the maintenance device 14 cannot be moved further upwards. As a result, the interaction elements 15 are positioned exactly in correspondence with the electrical conductors 6.

Positioned in the inserted state, the approach mechanism 16 is elastically deformed so that it exerts a spring force against the frame 10. As a result, the interaction elements 15 are moved towards the electrical conductors 6 and pressed against them.

When the maintenance device 14 is inserted into the shelf rail 3, the handle 18 is in line with the contact points between the interaction elements 15 and the electrical conductors 6. This means that the pressure exerted by the interaction elements 15 on the electrical conductor 6 can be increased without torque by simply pulling the handle 18 away from the reference wall 2 of the electronic shelf rail 3.

Figure 2B:
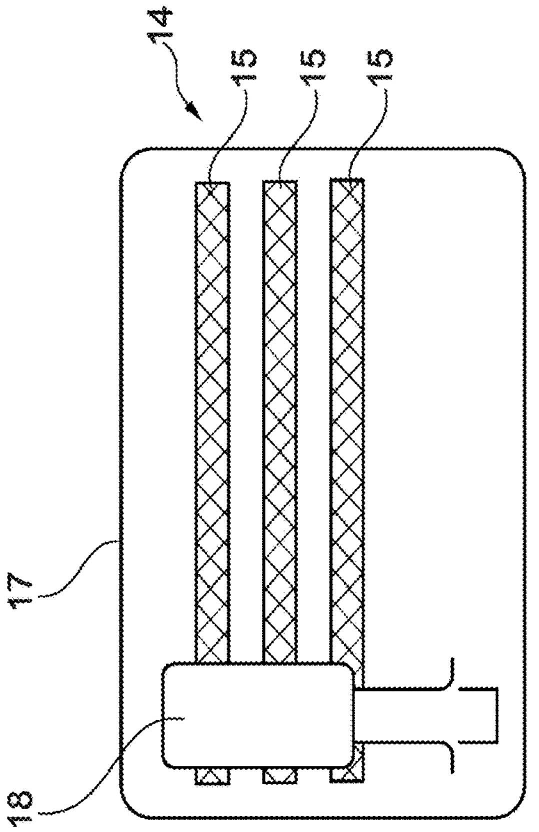
Figure 2A:
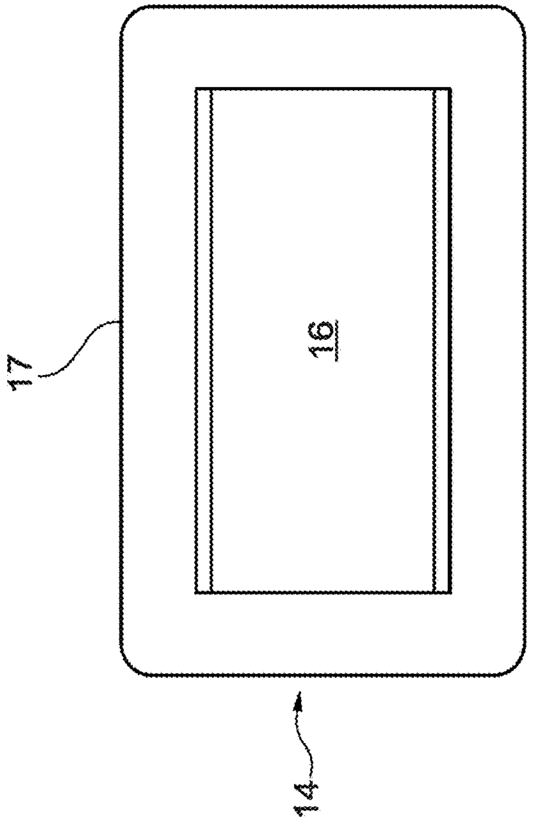

FIG. 2A shows the back of the maintenance device 14. Here the approach mechanism 16 is shown spanning a large area of the rear of the maintenance device 14. Therefore, the maintenance device 14 is pushed towards the electrical conductors evenly. At the same time, the flatly designed leg spring realizing the approach mechanism 16 prevents the leg spring from getting caught in the recess 13 of the electronic shelf rail 3.

FIG. 2B shows the front of the maintenance device 14. Here the interaction elements 15 and the handle 18 can be seen. The handle 18 is located eccentrically to ease the sliding (of the maintenance device 14 inside the electronic shelf rail 3) from the right to the left. The handle 18 is therefore placed eccentrically in the direction of the intended direction of movement of the maintenance device 14 within the electronic shelf rail 3.

Figure 3B:
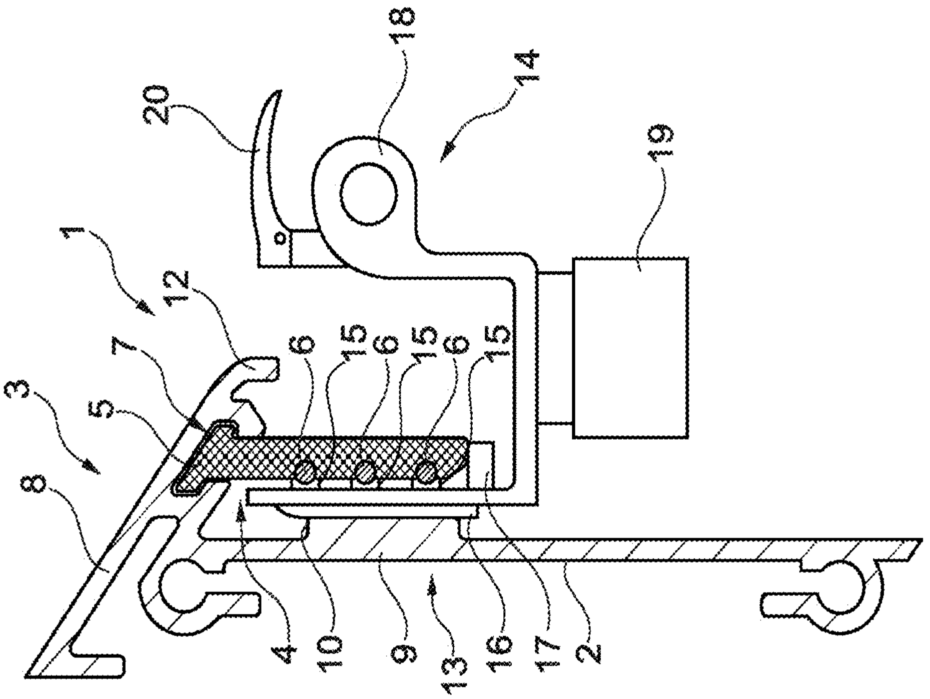
Figure 3A:
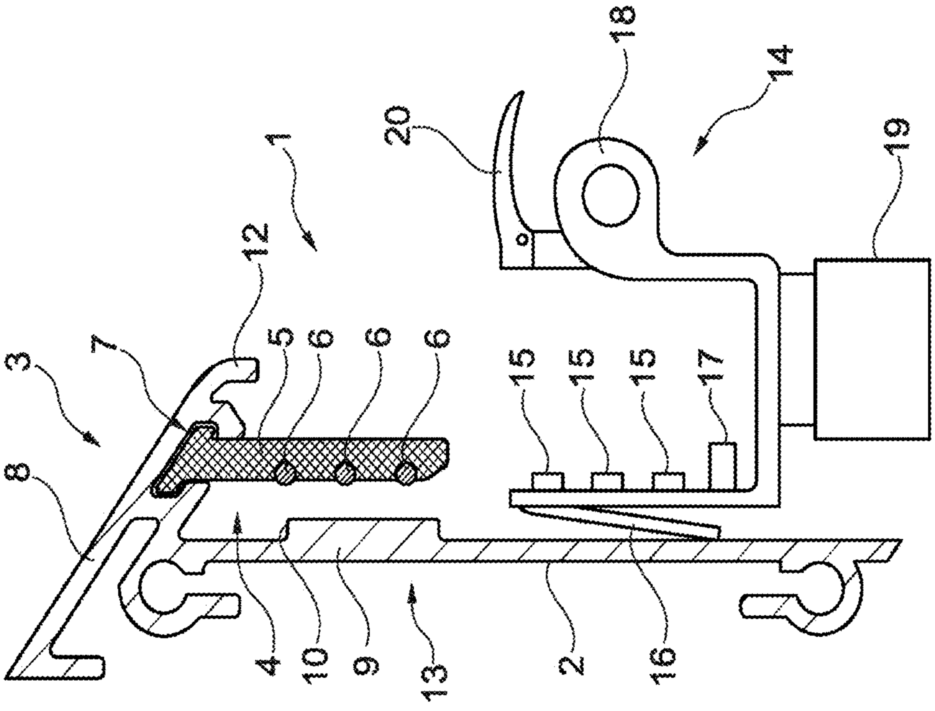

FIG. 3A and FIG. 3B show another exemplary embodiment of the system 1. In this exemplary embodiment the maintenance device 14 comprises additionally to the one presented above, a substance storage, realized as a substance-storage tank 19, comprising a maintenance-substrate. The substance storage tank 19 is connected with a hand-pump 20 and the interaction elements 15. The interaction elements 15 are designed for maintenance-substance interaction. An employee using this maintenance device 14 can operate the hand-pump 20. As a result, the maintenance-substrate is pumped from the substance-storage tank 19 to the interaction elements 15 via pipes and/or hoses and/or tubes in the maintenance device 14 and released on the electrical conductors 6 via nuzzles located under scouring pads. The substance movement is caused by the increase in pressure as a result of the actuation of the hand-pump 20. It should be noted here that a pump other than the hand-pump 20 can of course also be used in an equivalent manner.

In this embodiment, the insertion path limiting element 17 is realized by two cylinders that are mechanical end posts. The end posts 17 are positioned such that the insertion path is limited when they come in contact with the conductor-support 5. In this position the interaction elements 15 are properly placed corresponding to the electrical conductors 6. Both cylinders are located in a line normal to the image plane, so that only one can be seen because the second is located behind the first.

Figure 4:
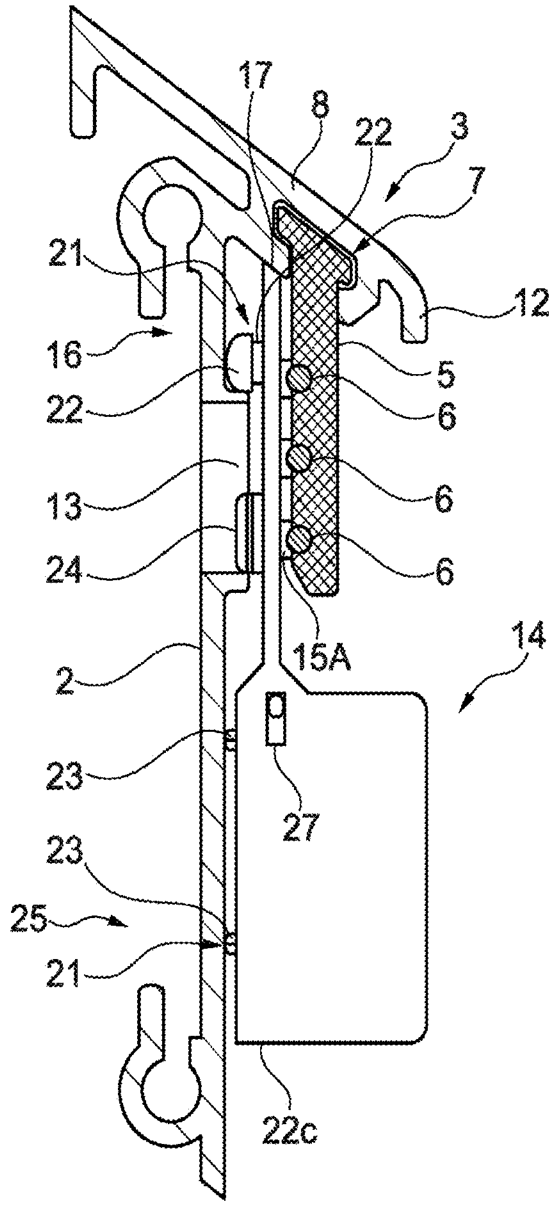
FIG. 4 a further embodiment of the maintenance device.

FIG. 4 shows another exemplary embodiment of the system 1. Here the maintenance device 14 is adapted to perform the maintenance process automatically and to drive along the electronic shelf rail 3 autonomously.

Figure 5B:
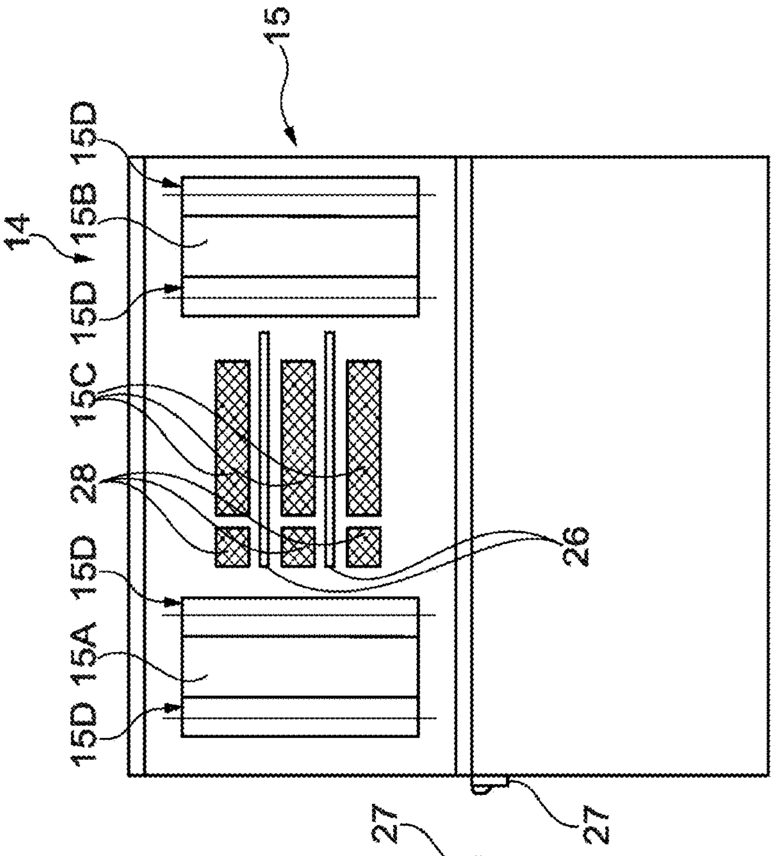
FIG. 5A-5B a front side and a rear side of the maintenance device according to FIG. 4.
Figure 5A:
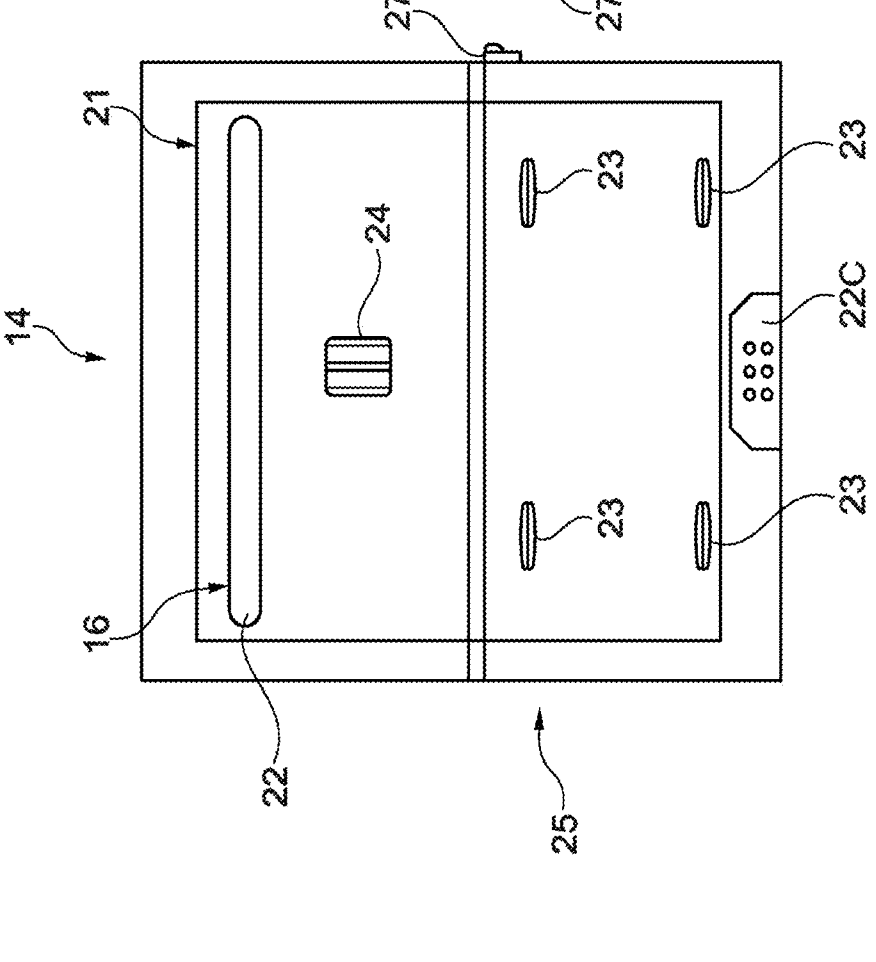

The rear of this automatic maintenance device 14 is shown in FIG. 5A and the front of this automatic maintenance device 14 is shown in FIG. 5B.

The maintenance device 14 comprises a guiding mechanism 21, that is designed to guide the interaction elements 15 when the maintenance device 14 is moved along the electronic shelf rail 3. The guiding mechanism 21 comprises a beam 22, four wheels 23 and a gear 24.

The wheels 23 and the gear 24 are driven by an electric motor (not shown) of the maintenance device 14 and thus also perform the task of a driving mechanism 25.

It should be mentioned at this point that only the wheels 23 or only the gear 24 would also be possible to provide the driving mechanism 25.

Here, the motor can drive one or more wheels 23 (and/or gears 24). In this embodiment, each driven wheel 23 and the gear 24 are driven by one electronic motor.

The gear 24 is designed to engage in the recess 13 of the electronic shelf rail 3.

The beam 22 is supported by two springs 22B at its ends. The beam 22 is connected to a button 22C via a lever mechanism inside the maintenance device 14. By pressing the button 22*c*, the beam 22 can be pulled into the interior of the maintenance device 14 so that the device can be inserted into the electronic shelf rail 3 or removed from the electronic shelf rail 3.

In this embodiment, the beam 22 is also designed to be supported against the reference wall 2 due to the spring force and thus to press the interaction elements 15 towards the electronics conductors 6. The beam 22 therefore also acts as an approach mechanism 16 here.

The interaction elements 15 are located on the front of the maintenance device 14.

Here the first interaction element 15A and the second interaction element 15B are each designed as a fabric that can each be moved around two rollers 15D. The rollers 15D are driven by electric motors located in the lower part of the maintenance device 14 housing. The fabric is wrapped around the rollers 15D like an endless belt. The rollers 15D protrude from the maintenance device 14 housing on the side intended for interaction, while they are covered by the maintenance device 14 housing on the rear of the maintenance device 14. The axes of the rollers 15D are shown in the FIG. 5B by dash-dotted lines.

Tree third interaction elements 15C are designed to perform a mechanical maintenance-interaction as well as a maintenance-substance interaction. For this purpose, each of the third interaction element 15C comprises a scouring pad that is located above one or a plurality of liquid outlet nozzle(s). The nozzles are connected to an electric pump and to a liquid tank inside the maintenance device 14. The liquid tank stores a liquid maintenance substance. Between the third interaction elements 15C there are sealing lips 26 that prevents the liquid maintenance substance from causing a short circuit between the electrical conductors 6.

The first interaction element 15A is designed to electrostatically charge the fabric as a result of the friction in order to remove particles from the electrical conductors 6 or their surroundings.

The second interaction element 15B is designed to wipe the electrical conductors 6 dry.

The maintenance device 14 also comprises three contacts 28. Two of them are used to contact the electrical conductors 6 to draw electrical power from the electronic shelf rail 3 in order to power electronics of the maintenance device 14. The third one may be used for data/signal-communication.

Furthermore, there is a limit switch 27 on the left side of the maintenance device 14.

The maintenance device 14 comprises a processing stage (not shown) as a part of the electronics that resides within the maintenance device 14.

The processing stage is connected with all the electrical components of the maintenance device 14 (motor(s), pump, limit switch 27, . . . ) and is designed to control these components and/or to process signals and/or data from these components.

In the following the processing of the processing stage is briefly explained.

The processing stage recognizes from the fact that the contacts 28 are supplied with power that the maintenance device 14 has been positioned on the electronic shelf rail 3. Two seconds later, the processing stage starts the motor of the first and second interaction element 15A and 15B. At the same time, the electric pump is started to provide the maintenance substance to the third interaction element 15C. Another three seconds later, the motors of the wheels 23 and the gear 24 are started. This timing provides that an employee who inserted the maintenance device 14 into the electronic shelf rail 3 has enough time to move his hand away and clear the way for the autonomous operation of the maintenance device 14. The maintenance device 14 then drives along the electrical shelf rail 3 until the limiting switch 27 is contacted. This can occur when the end of the electronic shelf rail 3 is reached or when the maintenance device 14 is in contact with the ESL 30 that is installed at the electronic shelf rail 3. In the latter case, the employee can remove the ESL 30 from the electronic shelf rail 3. The removal of the ESL 30 causes the limiting switch 27 to open its contact, which is detected by the processing stage. After a short delay of about one second, which is set in order not to endanger the employee, the maintenance device 14 then continues to move along the electronic shelf rail 3. As soon as the maintenance device 14 has passed, the employee can put the ESL 30 back in its place.

Figure 6:
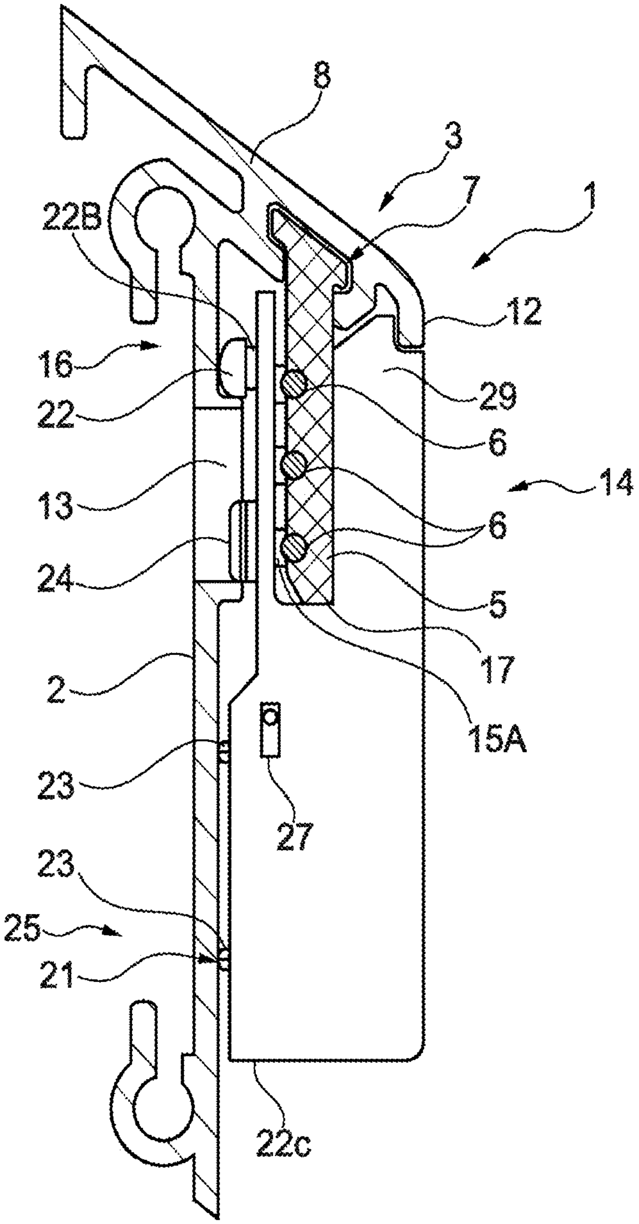
FIG. 6 a further embodiment of the maintenance device.

FIG. 6 shows the system 1 which comprises a further exemplary embodiment of the maintenance device 14. The maintenance device 14 in this embodiment comprises largely the same components as the one discussed above. In addition, the maintenance device 14 here comprises a support structure 29 that supports the conductor support 5 and prevents it from being deformed or misplaced by the maintenance device 14 during its maintenance interaction.

In this exemplary embodiment, the maintenance device 14 is largely in the form of the ESL 30

Such a maintenance device 14 in the form of an ESL 30, might also comprise a light source and a camera as an interaction element 15, which allows to capture still images or a video of the electrical conductors 6. The light source is therefore located such that it illuminates a section of one of the electrical conductors 6 or all of them so that the camera is enabled to properly capture a picture or a video of this section. The maintenance device 14 may also comprise a display installed on its front to display the (live) picture or video captured by the camera. With this light source and camara and display the user of the maintenance device can visually inspect the electrical conductors 6 as the maintenance device 14 moves along the electrical shelf rail 3.

Alternatively, or additionally the maintenance device 14 might be equipped with a radio module which is used to send the picture-data or video-data representing the picture or video captured by the camera to a server for further processing. The server can then analyze the image by means of pattern recognition and determine whether there are any alignment, form or positional errors or damages to the electrical conductors 6. If a discrepancy from an expected image or video content is detected, a discrepancy information massage can be transmitted to the maintenance device 14 and displayed by the maintenance device 14 on the display. Of course, the maintenance device 14 itself can also be designed for pattern recognition, so that no transmission to the server is necessary and analyses on the captured picture or video can take place directly in the maintenance device 14.

Figure 7C:
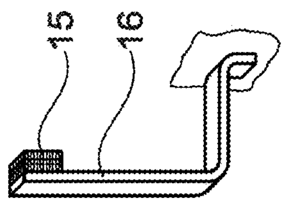
FIG. 7A-7C a further embodiment of the maintenance device with a shape very similar to electronic shelf labels used in the shelf rail.
Figure 7B:
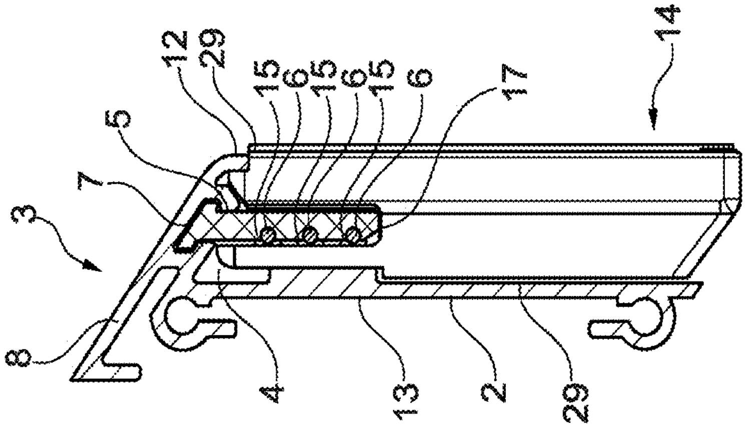
Figure 7A:
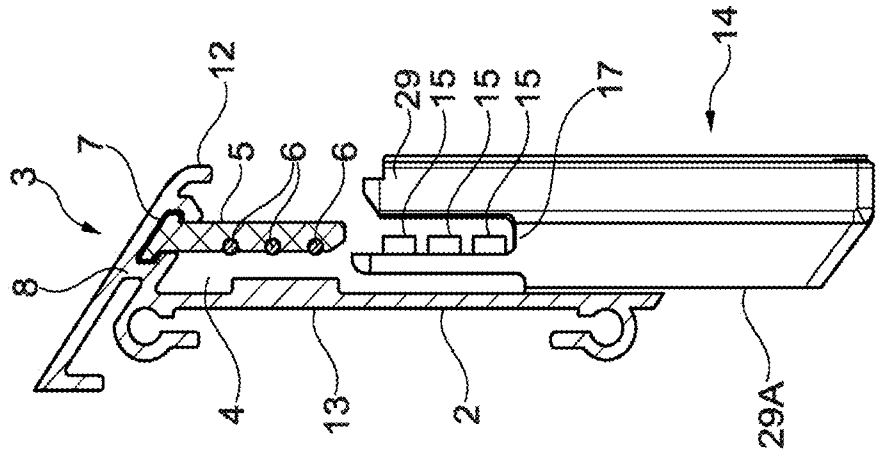

The FIGS. 7A-7B show a system 1 comprising a maintenance device 14 with a shape similar to the shape of an ESL 30. Unlike the ESL 30, the maintenance device 14 is not designed to hook into the recess 13 of the electronic shelf rail 3 and to support itself against the frame 10 of the electronic shelf rail 3. Instead, the rear of the maintenance device 14 is formed in the upper area to enable the maintenance device 14 to be moved past the frame 10. The maintenance device 14 in this embodiment is designed to be moved manually along the electronic shelf rail 3.

Here, the maintenance device 14 comprises the support structure 29, that supports the conductor support 5 and prevents it from being deformed or misplaced by the maintenance device 14. In addition, the rear wall of the maintenance device 14 realizes a second support structure 29*a* and is designed in such a way that the rear wall is in contact with the reference wall 2 of the electronic shelf rail 3 when the maintenance device 14 is inserted into the electronic shelf rail 3. As a result, the rear wall prevents the conductor carrier 5 from being levered by the maintenance device 14 as it might otherwise occur, when the maintenance device 14 is pressed against the reference wall 2 by the employee while moving the maintenance device 14 along the electronic shelf rail 3.

As exemplary shown in detail in FIG. 7C, the approach mechanism 16 is realized as a leg spring inside the maintenance device 14. The lower end of the leg spring is firmly connected to the structure of the maintenance device 14. The interaction element 15 is attached to the upper end of the leg spring. The interaction element 15 protrudes from the housing of the maintenance device 14 to enable contact to be made with the electrical conductors 6. The interaction element 15 is realized as a scouring pad.

This embodiment makes it possible to move the maintenance device 14 easily and quickly along the electronic shelf rail 3, while the approach mechanism 16 automatically ensures that the interaction elements 15 are pressed against the electrical conductors 6 with appropriate pressure to ensure maintenance interaction.

However, the interaction element 15 may also be placed on a spring leg, which only shows a straight form, so to save material and to ease the manufacturing process.

The spring leg can be made of metal or plastic or any other elastic material with appropriate material parameters.

Figure 10:
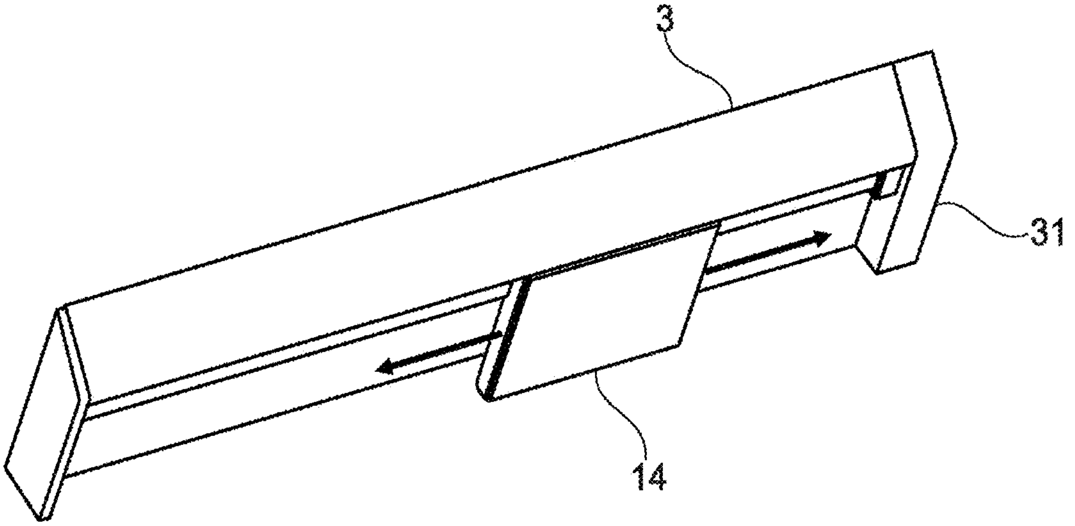
FIG. 10 the maintenance device, which is moveable to the left and right in the shelf rail.

FIG. 10 shows the maintenance device 14 that is shaped like the ESLs 30 and that is inserted into the shelf rail 3 and that is freely moved to the left and right side according to the arrows.

Figure 11:
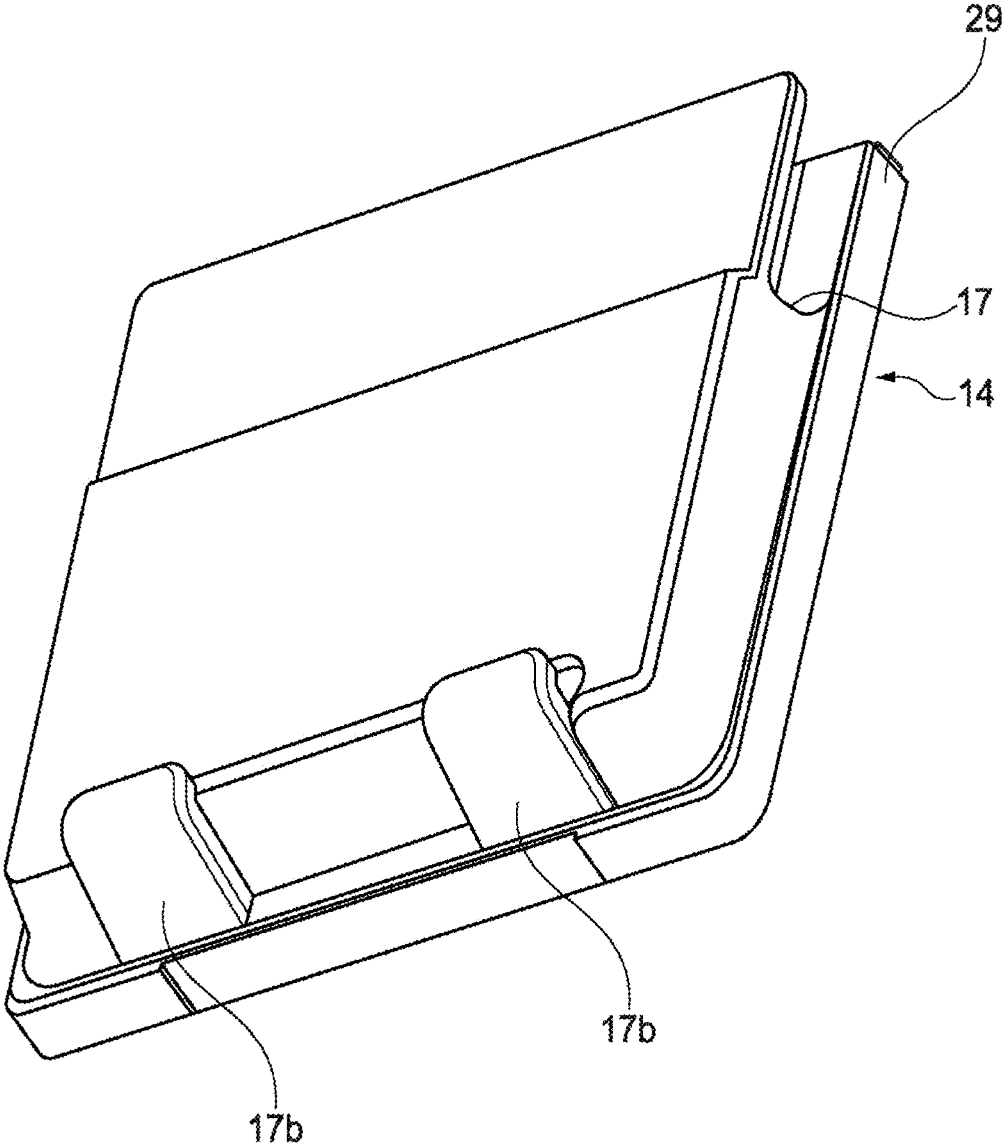
FIG. 11 another embodiment of the maintenance device with guide elements formed at the lower end.

FIG. 11 shows the maintenance device 14 from behind. The maintenance device 14 is for the most part shaped like the ESLs 30, but the rear side of the maintenance device 14 is shaped flat to allow sliding along the electronic shelf rail 3. Unlike the ESL 30, the maintenance device 14 does not comprise measures to hook into the recess 13 (see for example FIG. 9B) of the electronic shelf rail 3.

Such a maintenance device 14 can easily be manufactured based on the housing of an ESL 30 by modifying only that part of the housing which allows the ESL to letch into the recesses 13 of the electronic shelf rail 3.

In the exemplary embodiment presented in FIG. 11, the maintenance derives 14 furthermore comprises second insertion path limiting elements 17*b* that are designed to interact with the reference wall 2 of the electronic shelf rail 3. On the one hand, the second insertion path limiting elements 17*b* prevent the maintenance derive 14 from penetrating too deeply into the receiving groove 4 of the electronic shelf rail 3 and, on the other hand, it prevents the maintenance derive 14 from being released from the reference wall 2 when the maintenance derive 14 fully inserted into the receiving groove 4 and slides along the electronic shelf rail 3. The second insertion path limiting elements 17*b* therefor forms guide elements formed at the lower end of the maintenance device 14, which guide the maintenance device 14 during its movement along the shelf rail 3 to the left or the right, so that it cannot accidentally be swiveled forward away from the reference wall 2 of the electronic shelf rail 3 as long as it is in its maintenance interaction position.

Figure 12:
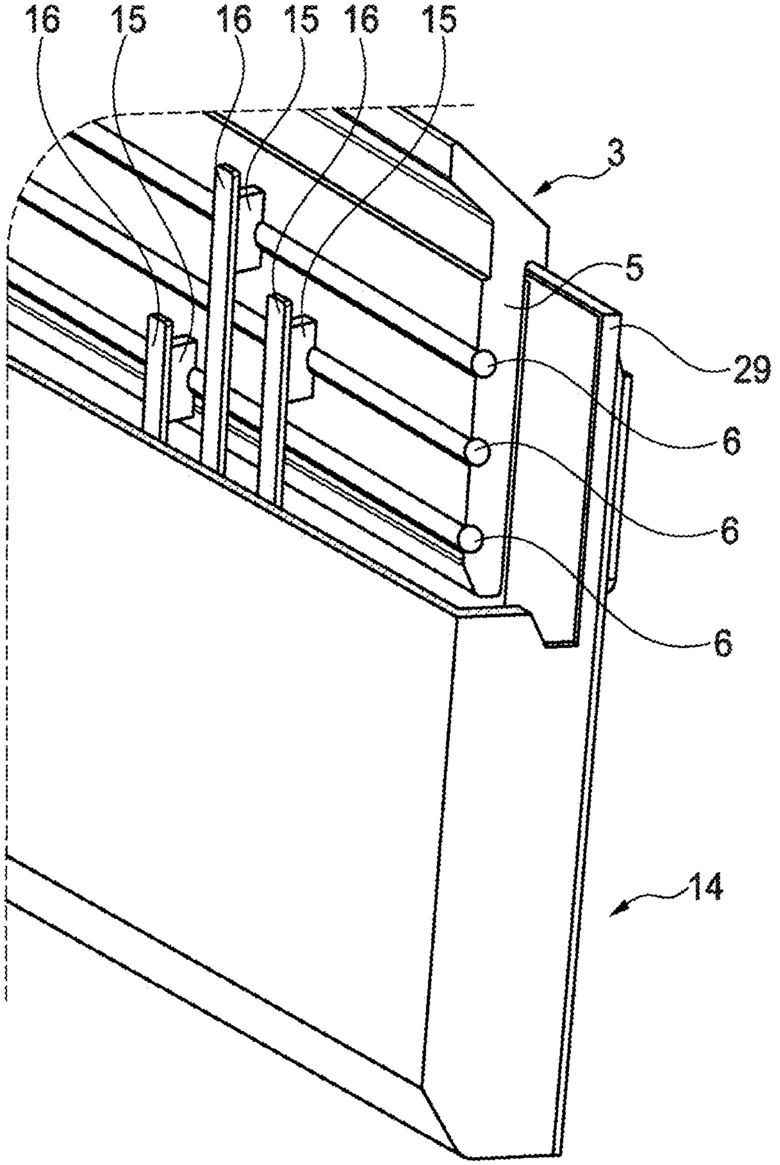
FIG. 12 the interaction of interaction elements of the maintenance device and electronical conductors of the shelf rail in a perspective section view, the rear wall of the maintenance device being cut away in this area of the housing of the maintenance device in this view.

FIG. 12 shows the maintenance device 14, fully inserted into the electronic shelf rail 3. In this visualization a part of the housing, which is the upper rear section of the housing, that would otherwise cover the interaction elements 15 of the maintenance device 14 is cut away to enable a view on the interaction elements 15. Each interaction element 15 is attached to one approach mechanism 16. Each interaction element 15 is placed in an exactly defined position relative to the electrical conductors 6 and interacts with exactly one of the electrical conductors 6 to maintain it.

Here the maintenance device 14 comprises three interaction elements 15, wherein each interaction element 15 is designed to interact with exactly one electrical conductor 6.

In this exemplary embodiment the approach mechanism 16 and the interaction element 15 are designed as described in FIG. 7C, i.e., the interaction element 15 is designed as a scouring pad attached to the approach mechanism 16 realized as a leg spring.

Finally, let it be noted once again that the figures described in detail above only involve exemplary embodiments, which the expert can modify in a wide variety of ways without departing from the area of the invention. For the sake of completeness, let it also be stated that use of the indeterminate article “a” or “an” does not mean that the respective features cannot be present multiple times.

The invention claimed is:

1. Shelf rail maintenance device (14) for the maintenance of at least one electrical conductor (6) of a shelf rail (3), wherein the electrical conductor (6) is located in a receiving groove (4) of an electronic shelf rail (3) and extends freely accessible along the length extension of the receiving groove (4), wherein the maintenance device (14) comprises at least one interaction element (15; 15A, 15B, 15C) which is designed for maintenance interaction with the at least one electrical conductor (6) of the electronic shelf rail (3), characterized in that at least a part of the maintenance device (14) is designed to fit into the receiving groove (4), such that the at least one interaction element (15; 15A, 15B, 15C) is position-able in the receiving groove (14) corresponding to the location of the at least one electrical conductor (6).

2. Shelf rail maintenance device (14) according to the claim 1, wherein the at least one interaction element (15; 15A, 15B, 15C) is designed for mechanical maintenance interaction.

3. Shelf rail maintenance device (14) according to claim 1, wherein the at least one interaction element (15; 15A, 15B, 15C) is designed for maintenance substance maintenance interaction.

4. Shelf rail maintenance device (14) according to claim 1, wherein the at least one interaction element (15; 15A, 15B, 15C) is designed for electrostatic maintenance interaction.

5. Shelf rail maintenance device (14) according to claim 1, wherein the at least one interaction element (15; 15A, 15B, 15C) is designed for airflow maintenance interaction.

6. Shelf rail maintenance device (14) according to claim 1, wherein the at least one interaction element (15; 15A, 15B, 15C) is designed for position and/or alignment check maintenance interaction.

7. Shelf rail maintenance device (14) according to claim 1, wherein the maintenance device (14) is designed to be movable along the shelf rail (3) in the receiving groove (4).

8. Shelf rail maintenance device (14) according to claim 1, wherein the maintenance device (14) comprises an approach mechanism that is designed to bring the at least one interaction element (15; 15A, 15B, 15C) in close proximity to or in contact with the at least one electrical conductor.

9. Shelf rail maintenance device (14) according to claim 1, wherein the maintenance device (14) comprises an insertion path limiting element (17; 17*b*) that is designed and or positioned to limit an insertion path of the maintenance device (14) when the maintenance device (14) is being entered into the receiving groove (4) of an electronic shelf rail (3) along an insertion path.

10. Shelf rail maintenance device (14) according to claim 1, that comprises a guiding mechanism, that is designed to guide the at least one interaction element (15; 15A, 15B, 15C) while the maintenance device (14) is moved along the shelf rail (3).

11. Shelf rail maintenance device (14) according to claim 1, wherein the maintenance device (14) comprises at least one moveable element which is movable relative to the maintenance device (14).

12. Shelf rail maintenance device (14) according to claim 1, wherein the maintenance device (14) comprises a driving mechanism (25) that is designed to drive the maintenance (14) device along the shelf rail (3).

13. Shelf rail maintenance device (14) according to claim 1, wherein the maintenance device (14) is designed to contact the at least one electrical conductor (6) of the shelf rail (3) electronically and wherein the maintenance device (14) is designed to draw power from the at least one electrical conductor (6) for its operation.

14. Shelf rail maintenance device (14) according to claim 1, wherein the maintenance device (14) comprises an energy storage to store energy, preferably electric energy.

15. Electronic shelf rail system (1) that comprises an electronic shelf rail (3) that is designed to carry at least one electronic device, in particular at least one electronic shelf label (30), wherein the electronic shelf rail (3) comprises at least one electrical conductor (6), preferred at least two electrical conductors (6), particularly preferred three electrical conductors (6), wherein the at least one electrical conductor (6) is located in a receiving groove (4) of the electronic shelf rail (3) and extends freely accessible along the length extension of the receiving groove (4), and at least one shelf rail maintenance device (4) according to claim 1 that is placed into the receiving groove (4) to perform a maintenance interaction with the at least one electrical conductor (6).

16. System (1) according to claim 15, wherein the at least one electrical conductor (6) is located on or in a conductor-carrier (5) that is designed to be encompassed by the at least one electronic device (30), preferably in a way that the at least one electrical conductor (6) faces away from a front of the electronic device (30).

* * * * *